May 1, 1951     A. HANSEN, JR     2,551,265

HALL EFFECT REGULATOR AND BALANCING SYSTEM

Filed July 28, 1949

Inventor:
Albert Hansen, Jr.
by Charell V. Mack
His Attorney.

Patented May 1, 1951

2,551,265

UNITED STATES PATENT OFFICE 2,551,265

HALL EFFECT REGULATOR AND BALANCING SYSTEM

Albert Hansen, Jr., Lynn, Mass., assignor to General Electric Company, a corporation of New York Application July 28, 1949, Serial No. 107,273

5 Claims. (Cl. 171—95)

My invention relates to electric regulators and utilizes a permanent magnet as a standard of reference which is compared to a current to be regulated or measured through the medium of a coil and a Hall plate. The fields of both the permanent magnet and that produced by the current flowing in a coil are associated in bucking relation in a Hall plate having an output voltage proportional to any difference in such fields. The output voltage may then be used to control or measure the current.

Figure 1:
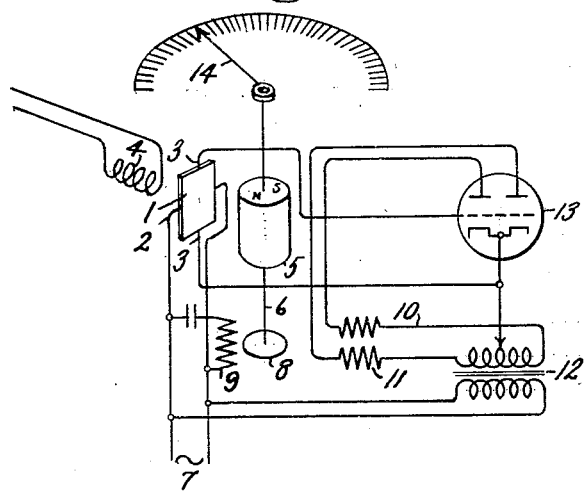
Figure 2:
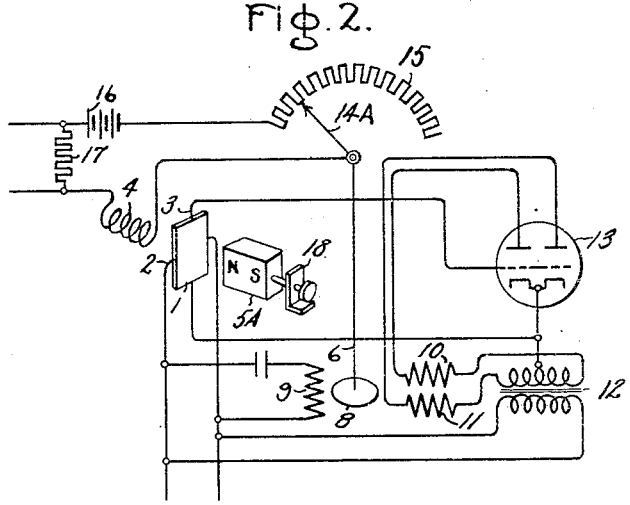

The features of my invention which are believed to be novel and patentable will be pointed out in the claims appended hereto. For a better understanding of my invention reference is made in the following description to the accompanying drawings in which Fig. 1 illustrates the application of my invention for current measurement; Fig. 2 its application as a constant current controller.

Referring now to Fig. 1, I represents a Hall plate such, for example, as germanium which has the Hall effect to a large degree. The Hall plate is a thin rectangular sheet of germanium having current input distributed over opposite edges by connections 2 and voltage output terminals 3 at the centers of the other opposite edges. Closely adjacent one side of the plate I is a coil 4 positioned so that if current flows in the coil, the resulting flux will cut the Hall plate at right angles to its flat surface. Also closely adjacent the other side of the Hall plate is a cylindrical permanent magnet 5 mounted for rotation with a shaft 6 such that more or less of the flux of such permanent magnet may cut the Hall plate in opposition to any flux from coil 4. It is here assumed that direct current flows in coil 4. The permanent magnet 5 is well stabilized so that its permanent magnet strength will not change and thus may be used as a standard of reference with which to compare the current in coil 4 for any given rotary position of such magnet. The Hall plate is energized through the current input terminals 2 from a source of alternating current 7, and hence, an alternating voltage of the same frequency will appear across its output terminals 3 whenever the opposed fluxes from 4 and 5 through the Hall plate do not balance. If the flux of coil 4 predominates, the output voltage will have one phase relation with respect to source 7; and if the permanent magnet flux predominates, the output voltage will have a 180-degree phase relation from that first mentioned.

A split phase motor 8 is used to position the shaft 6 and permanent magnet 5. This motor has a winding 9 energized directly from source 7, and windings 10 and 11 which may be energized from source 7 through a transformer 12 and a double phase sensitive power amplifier 13.

The control grids of the power amplifier are biased in accordance with the voltage output of the Hall plate 1, and the arrangement is such that if the flux of coil 4 predominates, one-half of the amplifier will pass current and energize motor winding 10, causing the motor to run in the direction to increase the flux of magnet 5 through the Hall plate; and if the flux of permanent magnet 5 predominates in the Hall plate, the other half of amplifier 13 will pass current, energizing motor winding 11 and causing the motor to run in the opposite direction to decrease the flux of the permanent magent 5 through the Hall plate. When there is a balanced flux condition in the Hall plate, its output voltage is zero, neither side of the amplifier 13 passes current, and the motor 8 remains stationary. Thus the regulating action is to maintain the opposed fluxes through the Hall plate balanced and the standardized permanent magnet in a rotary position where its flux influencing the Hall plate is equal and opposite to that produced by coil 4. It thus follows that the rotary position of shaft 6 is a measure of the current flowing in coil 4. Such shaft is provided with an arm 14 which may indicate or record the value of such current. It is to be noted that when a measurement balance is obtained, the measurement is independent of the alternating current input to the Hall plate, and hence, voltage and frequency variations of the source 7 do not produce error.

No moving contacts are involved in this accurate phase sensitive regulator which is standardized by the well stabilized permanent magnet 5. While in Fig. 1 the position of the permanent magnet 5 has been shown as adjustable and the coil 4 and Hall plate I stationary, other arrangements for producing relative movement of one of these parts to maintain the opposed fluxes which influence the Hall plate equal may be used.

In Fig. 2, I have represented my invention for obtaining a constant current and voltage. A stationary stabilized permanent magnet 5A is substituted for the rotary permanent magnet 5 of Fig. 1, and the shaft 6 driven by motor 8 is used to adjust a current regulator, here consisting of a rheostat arm 14A and resistance 15. Current from a source of supply 16 flows through a potentiometer resistance 17, the coil 4, and regulator at 15. When the fluxes of the permanent magnet 5A and coil 4 are equal and opposite, the motor does not run. This condition may be adjusted for any desired value of current in the circuit of coil 4 as by making the position of the permanent magnet 5A adjustable and moving it toward or away from the Hall plate I by an adjusting device indicated at 18.

If, now, the current in coil 4 increases above the desired value, the Hall plate will have a voltage output of such phase relation as to run motor 8 in a direction to increase the resistance at 15 until the correct current condition is restored. On the other hand, if the current in coil 4 decreases below the desired value, the Hall plate 1 will have an output voltage of the reverse phase relation and cause the motor 8 to run in the reverse direction, reducing the resistance at 15 until the correct current is restored. Thus the current in the controlled circuit is kept constant and a standardized voltage may be taken off from the potentiometer resistance 17, the voltage being standardized by the well stabilized permanent magnet 5A.

In accordance with the provisions of the Patent Statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A regulator comprising a Hall plate having current input terminals and voltage output terminals, a direct current coil positioned adjacent said Hall plate such that when current flows in the coil a proportional flux from the coil cuts the Hall plate, a stabilized permanent magnet also adjacent the Hall plate for producing a flux which cuts the Hall plate in opposition to the flux from said coil, a source of alternating current supply connected to the current input terminals of said Hall plate for supplying energizing current thereto, a phase sensitive amplifier also supplied from said source and having control grids connected to be biased by the output voltage of said Hall plate, and regulating means including a reversible alternating current motor supplied from said source and controlled by said amplifier for producing a regulating action with respect to one of the fluxes which cuts the Hall plate to maintain the opposed fluxes which cut the Hall plate equalized.

2. A regulator comprising a Hall plate having current input and voltage output terminals, a direct current coil positioned adjacent said plate such that when current flows in the coil a proportional flux from such coil cuts the Hall plate, a stabilized permanent magnet also positioned adjacent said plate such that flux therefrom may cut the Hall plate in opposition to the flux from said coil, one of the said previously mentioned elements being movable for the purpose of varying the relative magnitude of the opposed fluxes which cut the Hall plate, an alternating current source of supply connected to supply energizing current to the input current terminals of said Hall plate, a phase sensitive amplifier supplied from said source and having control grids biased in response to the output voltage from said Hall plate, and a reversible motor controlled by said amplifier for adjusting said movable element, said motor operating in one direction to re-balance the opposing fluxes when the flux from said coil predominates and in the opposite direction to re-balance the opposing fluxes when the flux from the permanent magnet predominates and being stationary when such opposing fluxes are balanced.

3. Regulating apparatus comprising a stationary Hall plate having current input and voltage output terminals, a stationary direct current coil for producing a flux which cuts said Hall plate, a stabilized permanent magnet mounted for rotation adjacent said Hall plate for producing a flux which cuts said Hall plate in opposition to the flux from the coil, such flux from the permanent magnet which influences the Hall plate being adjustable by rotation of said magnet, a current supply for supplying energizing current to the input terminals of said Hall plate, a reversible electric motor for rotating said permanent magnet, amplifier apparatus controlled by the output voltage of said Hall plate and controlling the starting and stopping of said motor and its direction of rotation, the action of said amplifier being such as to cause the motor to rotate in a direction to increase the permanent magnet flux cutting the Hall plate when the coil flux predominates and vice versa, and to stop the motor when the opposed fluxes cutting the Hall plate are balanced, and means also operated by said motor for giving a measurement indication of the value of the coil current when the opposing fluxes are balanced.

4. A regulator comprising a Hall plate having current input and voltage output terminals, a stationary direct current coil positioned adjacent said Hall plate to produce a flux through said Hall plate proportional to any current flowing in the coil, a stationary stabilized permanent magnet for producing a flux through the Hall plate in opposition to the coil flux, a source of supply for supplying energizing current to the input current terminals of said Hall plate, a current regulator for regulating the current which flows in said coil, a reversible electric motor for adjusting said current regulator and amplifier apparatus controlled by the output voltage of said Hall plate and controlling the starting and stopping and the direction of rotation of said reversible motor, the action of said amplifier as controlled by the Hall plate output voltage being such as to control the operation of said motor and current regulator to maintain the coil current constant at a value where the opposing fluxes cutting said Hall plate are equal.

5. In a regulator means for comparing the value of a direct current with the flux of a stabilized permanent magnet used as a standard, comprising a Hall plate having current input and voltage output terminals, a coil positioned adjacent said Hall plate and connected in a circuit in which the comparison direct current flows for producing a flux through said Hall plate which is proportional to such current, and a stabilized permanent magnet also positioned adjacent said Hall plate to produce a flux therethrough in a direction to oppose the coil flux therethrough, the resultant, if any, of the opposing fluxes through said Hall plate being in a direction to produce a Hall plate output voltage when the current input terminals thereof are energized, said Hall plate output voltage reversing in direction in relation to the direction of the Hall plate input current when the resultant of said opposing fluxes through the Hall plate reverses.

ALBERT HANSEN, Jr.

REFERENCES CITED

The following references are of record in the file of this patent:

UNITED STATES PATENTS

| Number | Name | Date |
|---|---|---|
| 2,226,847 | Clark | Dec. 31, 1940 |
| 2,365,430 | Naul | Dec. 19, 1944 |
| 2,464,807 | Hansen | Mar. 22, 1949 |